Patented Sept. 21, 1948

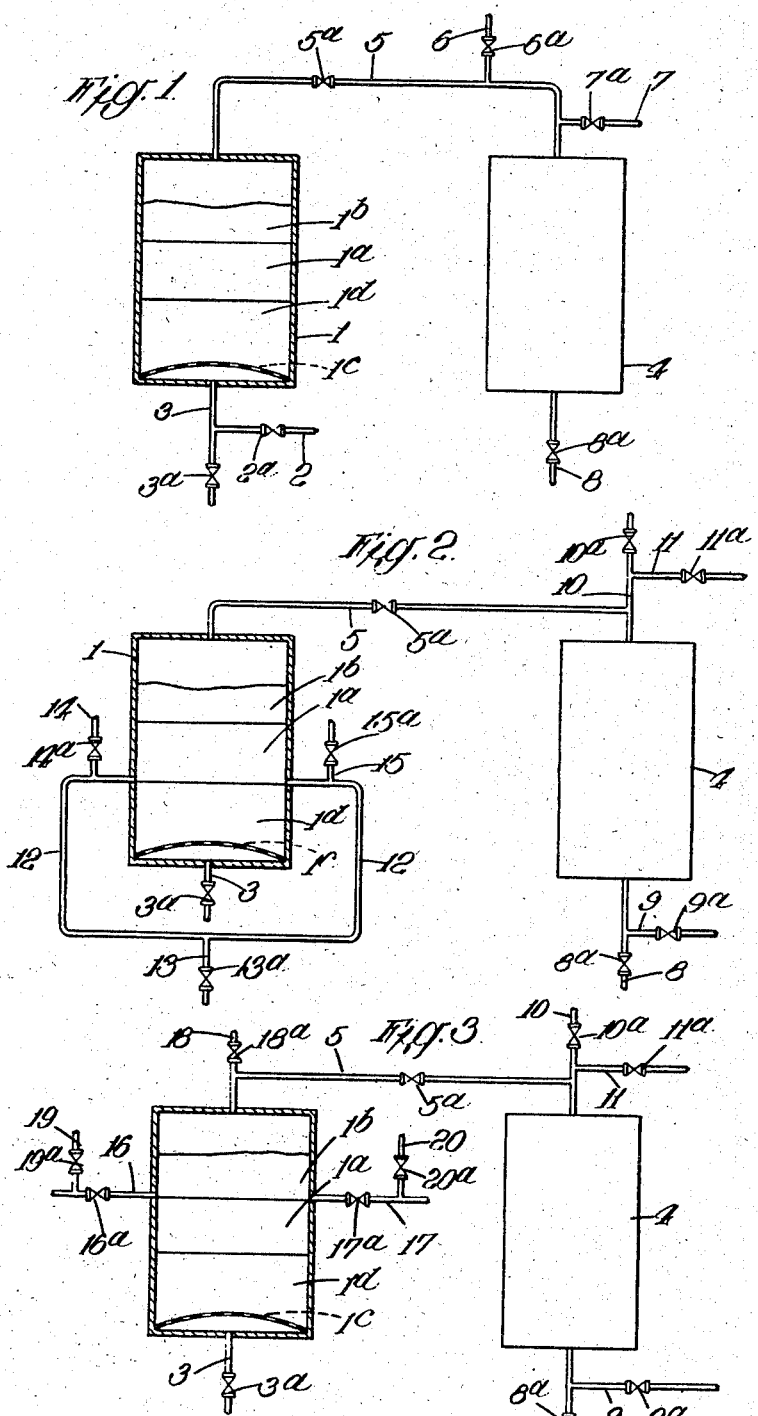

2,449,729

UNITED STATES PATENT OFFICE 2,449,729

PROCESS FOR THE PRODUCTION OF INDUSTRIAL OR POWER GASES

Michael Steinschlaeger, London, England

Application December 29, 1944, Serial No. 570,482
In Great Britain September 24, 1942

6 Claims. (Cl. 48—197)

This invention relates to a process for the production of industrial or power gases.

In producing carburetted water gas or like carburreted gases such as oil gases, it is of great importance to be in a position to vary considerably the proportion of consumption of solid fuels to oil and the capacity of an existing plant at short notice to meet the changeable requirements.

The object of the present invention is to provide a simple and efficient process, which has the above mentioned characteristics, flexibility and advantages, coupled with a considerable decrease in solid and fluid fuel consumption.

Accordingly the present invention provides a process for the manufacture of industrial power gases such as carburetted water gas and oil gases in which a bed of solid fuel or a mixture of solid fuel with tar or oil in a generator is subjected to alternate blowing and gas making periods and the heat of the gases leaving the generator in a blowing period alone or in admixture with other fuels is utilised to heat a regenerator whereafter steam with or without carbon dioxide and with or without a fluid fuel or a mixture of water gas, oil vapour and cracking products is passed through the regenerator and the sensible heat of the gases leaving the regenerator is utilised with or without further heating and with or without the addition of other hot gases to effect cracking of oil, tar or the like mixed with said gases leaving the regenerator for carburetting the same.

The gases leaving the reaction zone in the generator have the average temperature of the reaction zone. If these gases are removed at the top or bottom of this zone the temperature of these gases will be the average temperature in the reaction zone. If a lower temperature is required or desirable or less sensible heat is required in the gases the point or points at which these gases are removed is at some distance from the top or bottom of the reaction zone so that a part of the heat is stored in the ash and/or fuel bed and the gases will be cooler or in the latter case one part of the gases is removed at the top or bottom of the reaction zone and the other part at a distance from the reaction zone.

Further tar, oil or the like may be mixed with the industrial and power gases obtained by the process of the present invention and the mixture then further heated to crack the oil, tar or the like. This treatment may be repeated if desired.

In the application of the invention to the manufacture of gases used for power generation a carburetted water gas produced by the process of the invention may be used to drive an engine and the sensible heat of exhaust gases from said engine with or without admixture with other gases may be used to evaporate and crack oil, tar or the like mixed with said exhaust gas for the carburetion thereof.

A carburetted water gas plant comprising a generator, a carburettor and a superheater may be used to carry out the process of the invention or an ordinary water gas plant comprising a generator and one or two regenerators can be used.

The process of the invention will now be further described with reference to the accompanying diagrammatic drawings, in which:

Fig. 1 shows a blowing period;
Fig. 2 shows a down gas making period, and
Fig. 3 shows an up gas making period.

1. *Blowing period.*—Referring to Fig. 1 of the drawings, air or oxygen-containing gases which may be pre-heated if desired are passed via pipe 2 controlled by valve 2a into pipe 3 and thence through a generator 1 having a grate 1c. The blow gases leaving the reaction zone 1a pre-heat the coke 1b and above this a part of the heat in the blow gases (with or without the addition of secondary air) may be stored in the coke bed for superheating the steam used in the gas making period. The rest of the heat in the blow gases (sensible and potential) is stored in the regenerator 4, which is connected to the generator 1 by pipe 5 controlled by valve 5a. If required this heat may be increased by the addition of other gases or liquid fuels such as water gas, tar, oils and tars admitted through pipe 6 and secondary air through pipe 7 controlled respectively by valves 6a and 7a, or the heat is provided entirely by the latter fuels and the blow gases are used in another regenerator for superheating the steam or pre-heating the air used in the reaction. The blow gases leave the regenerator through pipe 8 controlled by valve 8a.

2. *Down gas making period.*—Referring to Fig. 2 of the drawings, steam is admitted through pipe 9 controlled by valve 9a into the regenerator 4 heated in a preceding blowing period as described above. The steam is superheated in the regenerator and part of the superheated steam is withdrawn via pipe 10 controlled by valve 10a and mixed with oil introduced through pipe 11 controlled by valve 11a, the sensible heat of the steam being sufficient to crack the oil. The remainder of the superheated steam passes via pipe 5 into the generator 1. A part of the gas made is withdrawn via pipes 12 and 13 controlled by valve 13a. Oil is admitted through pipes 14 and 15 controlled respectively by valves 14a and 15a to carburet the gas produced. The remainder of the gas made is removed through pipe 3 controlled by valve 3a so that some of the heat thereof is stored in the ash 1d.

3. *Up gas making period.*—Referring to Fig. 3 of the drawings, steam and/or carbon dioxide and/or superheated steam and/or pre-heated carbon dioxide is introduced into the generator 1 in the up direction, through pipe 3 controlled by valve 3a. The gases and undecomposed steam and/or carbon dioxide leaving the reaction zone 1a leave the generator 1 so as to possess a pre-determined amount of sensible heat by taking out a part of the gases through pipes 16 and 17 controlled respectively by valves 16a and 17a and by storing a part of the heat in these gases in the coke 1b by withdrawing the remainder of the gas made through pipe 18 controlled by valve 18a, valve 5a being closed.

The sensible heat of these gases is used for evaporating and cracking of oil admitted through pipes 19 and 20 controlled respectively by valves 19a and 20a. At the same time steam and/or carbon dioxide or a mixture of steam and/or carbon dioxide and the water gas tar produced and/or other oils, tars, pitches or the like is introduced through pipe 9 into the regenerator 4 for superheating and/or water gas production. The sensible heat of the above-mentioned gases leaving the regenerator through pipe 10 is also used for cracking oil admitted through pipe 11. If desirable oxygen may be added to the mixture, in this case the regenerator can be used continuously for gas production. The gases coming from the generator and regenerator may be mixed or used separately. The sensible heat of the gases produced may be used for steam generating preferably using an electrostatic precipitator as a boiler.

The process is very flexible concerning the alteration of the output of the same plant, the possibilities of the alteration of the calorific value of the gas produced, and the variation of the ratio between the ratio of liquid to the solid fuels used, gases with different calorific values can be produced and different oils (cracked at different temperatures) can be advantageously used at the same time.

If coke or coal of smaller size should be used for gas production and the plant consist of several units, some of the units can be used for generating producer gas for admixture with the carburetted water gas. The sensible heat of the producer gas alone or in admixture with pre-heated steam and/or gases can also be used for carburetting purposes. By this method a considerable increase in capacity can be achieved and fuels of low calorific and market value used.

As solid fuels different kinds of coke, coal, briquettes, etc., can be used.

As fluid fuels hot or cold oils, tars, pitches, distillation gases, etc., can be used with better results than in well known processes because the treatment of the oil or gas is not so severe as in the known processes.

The process can be applied to generator constructions in which the ash leaves the generator in solid or fluid condition or with mechanically operated grates.

The pre-heated steam and air are introduced according to their temperature and the construction of the generator at such places as to achieve the most advantageous conditions and results. For instance, when using a generator having a mechanically operated grate they are introduced above the grate or if the temperatures of the air and steam are different at different distances from the bottom or top of the generator.

When using coal this is preferably only partly pre-heated in the blow period (up to a temperature at which carbonisation just begins) so as to obtain oil or a greater part of the carbonisation gases and the tar or cracked tar in the gases leaving the generator in the gas making period. Thereby the calorific value of these gases is increased and less oil is used for carburetting or by using the same proportion of oil a higher calorific value of the gas produced is obtained.

When using coke for generating gas the pre-heating of the coke is preferably divided between the blow and gas making periods or the blow gases and the gases produced are taken out at different points of the generator, so as to achieve the most advantageous temperatures and conditions for carburetting the oil, fuel consumption and increase in capacity.

It should be understood that the term "tar, oil or the like" as used herein includes hydrocarbon gases and when these are used no evaporation will be necessary prior to the cracking.

This application is a continuation-in-part of my application Serial No. 494,730, filed July 14, 1943, now abandoned.

I claim:

1. A process for the production of industrial and power gases in which a bed of solid fuel or a mixture of solid fuel with oil is subjected to alternate blowing and gas making periods in a generator, which comprises subjecting the fuel in the generator to blowing, withdrawing blowing gases from the generator, passing said gases through a regenerator to heat the same, thereafter passing steam through said regenerator to produce superheated steam, mixing said superheated steam with oil, the said superheated steam being at a sufficiently high temperature and possessing sufficient sensible heat to crack the oil, passing steam through the generator to make gas, withdrawing the made gas from the generator between a boundary of the reaction zone and a boundary of the fuel bed and mixing said made gas with oil to carburet the same, the carburetting of the made gas being effected solely by the sensible heat of the made gas.

2. A process for the production of industrial and power gases in which a bed of solid fuel or a mixture of solid fuel with oil is subjected to alternate blowing and gas making periods in a generator, which comprises subjecting the fuel in the generator to blowing, withdrawing blowing gases from the generator, passing said gases through a regenerator to heat the same, thereafter passing steam and fluid fuel through said regenerator to produce a mixture of gases by the reaction of the steam and the fluid fuel, mixing said mixture of gases with oil the said mixture of gas being at a sufficiently high temperature and possessing sufficient sensible heat to crack the oil, passing steam through the generator to make gas, withdrawing the made gas from the generator between a boundary of the reaction zone and a boundary of the fuel bed and mixing said made gas with oil to carburet the same, the carburetting of the made gas being effected solely by the sensible heat of the made gas.

3. A process for the production of industrial and power gases in which a bed of solid fuel or a mixture of solid fuel with oil is subjected to alternate blowing and gas making periods in a generator, which comprises subjecting the fuel in the generator to blowing, withdrawing blowing gases from the generator, passing said gases through a regenerator to heat the same, thereafter passing steam and carbon dioxide through said regenerator to produce a mixture of hot gases, mixing said mixture of gases with oil the said mixture of gases being at a sufficiently high temperature and possessing sufficient sensible heat to crack the oil, passing steam through the generator to make gas, withdrawing the made gas from the generator between a boundary of the reaction zone and a boundary of the fuel bed and mixing said made gas with oil to carburet the same, the carburetting of the made gas being effected solely by the sensible heat of the made gas.

4. A process for the production of industrial and power gases in which a bed of solid fuel or a mixture of solid fuel with oil is subjected to alternate blowing and gas making periods in a generator, which comprises subjecting the fuel in the generator to blowing, withdrawing blowing gases from the generator, passing said gases through a regenerator to heat the same, thereafter passing steam, carbon dioxide and fluid fuel through said regenerator to produce a mixture of gases by the reaction of the steam, carbon dioxide and fluid fuel, mixing said mixture of gases with oil the said mixture of gases being at a sufficiently high temperature and possessing sufficient sensible heat to crack the oil, passing steam through the generator to make gas, withdrawing the made gas from the generator between a boundary of the reaction zone and a boundary of the fuel bed and mixing said made gas with oil to carburet the same, the carburetting of the made gas being effected solely by the sensible heat of the made gas.

5. A process for the production of industrial and power gases in which a bed of solid fuel or a mixture of solid fuel with oil is subjected to alternate blowing and gas making periods in a generator, which comprises subjecting the fuel in the generator to blowing, withdrawing blowing gases from the generator, passing said gases through a regenerator to heat the same, thereafter passing steam, water gas, oil vapour and cracking products through said regenerator to produce a mixture of hot gases by the reaction of the steam, oil vapour and cracking products, mixing said mixture of gases with oil the said mixture of gases being at a sufficiently high temperature and possessing sufficient sensible heat to crack the oil, passing steam through the generator to make gas, withdrawing the made gas from the generator between a boundary of the reaction zone and a boundary of the fuel bed and mixing said made gas with oil to carburet the same, the carburetting of the made gas being effected solely by the sensible heat of the made gas.

6. A process for the production of industrial and power gases in which a bed of solid fuel or a mixture of solid fuel with oil is subjected to alternate blowing and gas making periods in a generator provided with a grate, which comprises subjecting the fuel in the generator to blowing, withdrawing blowing gases from the generator, mixing the said withdrawn gases with another fuel and with an oxidizing gas, passing the mixture thus obtained through a regenerator to heat the same, thereafter passing steam through said regenerator to produce superheated steam, mixing said superheated steam with oil, the said superheated steam being at a sufficiently high temperature and possessing sufficient sensible heat to crack the oil, passing steam through the generator in a downward direction to make gas, withdrawing the made gas from the generator between the lower boundary of the reaction zone and the grate, and mixing said made gas with oil to carburet the same, the carburetting of the made gas being effected solely by the sensible heat of the made gas and the undecomposed steam.

MICHAEL STEINSCHLAEGER.

REFERENCES CITED

The following references are of record in the file of this patent:

UNITED STATES PATENTS

| Number | Name | Date |
|---|---|---|
| 166,036 | Spencer | July 27, 1875 |
| 978,853 | Cutter | Dec. 20, 1910 |
| 1,821,333 | Tolman | Sept. 1, 1931 |
| 1,862,018 | Jones | June 7, 1932 |
| 1,867,102 | Russell | July 12, 1932 |
| 1,958,671 | Mathesius | May 15, 1934 |
| 2,086,340 | Steinwedell | July 6, 1937 |
| 2,280,869 | Terzian | Apr. 28, 1942 |

FOREIGN PATENTS

| Number | Country | Date |
|---|---|---|
| 36,715 | Switzerland | Apr. 3, 1906 |